F. W. HOCHSTETTER.
CONVERTIBLE MOVING PICTURE MACHINE.
APPLICATION FILED MAR. 22, 1919.

1,372,619.

Patented Mar. 22, 1921.
4 SHEETS—SHEET 1.

WITNESS
A. Gutnagel

INVENTOR
Frederick W. Hochstetter
BY
H. T. Criswell
ATTORNEY

F. W. HOCHSTETTER.
CONVERTIBLE MOVING PICTURE MACHINE.
APPLICATION FILED MAR. 22, 1919.

1,372,619.

Patented Mar. 22, 1921.
4 SHEETS—SHEET 2.

WITNESS
A. Spitznagel

INVENTOR
Frederick W. Hochstetter
BY
H. T. Criswell
ATTORNEY

F. W. HOCHSTETTER.
CONVERTIBLE MOVING PICTURE MACHINE.
APPLICATION FILED MAR. 22, 1919.
1,372,619.
Patented Mar. 22, 1921.
4 SHEETS—SHEET 3.
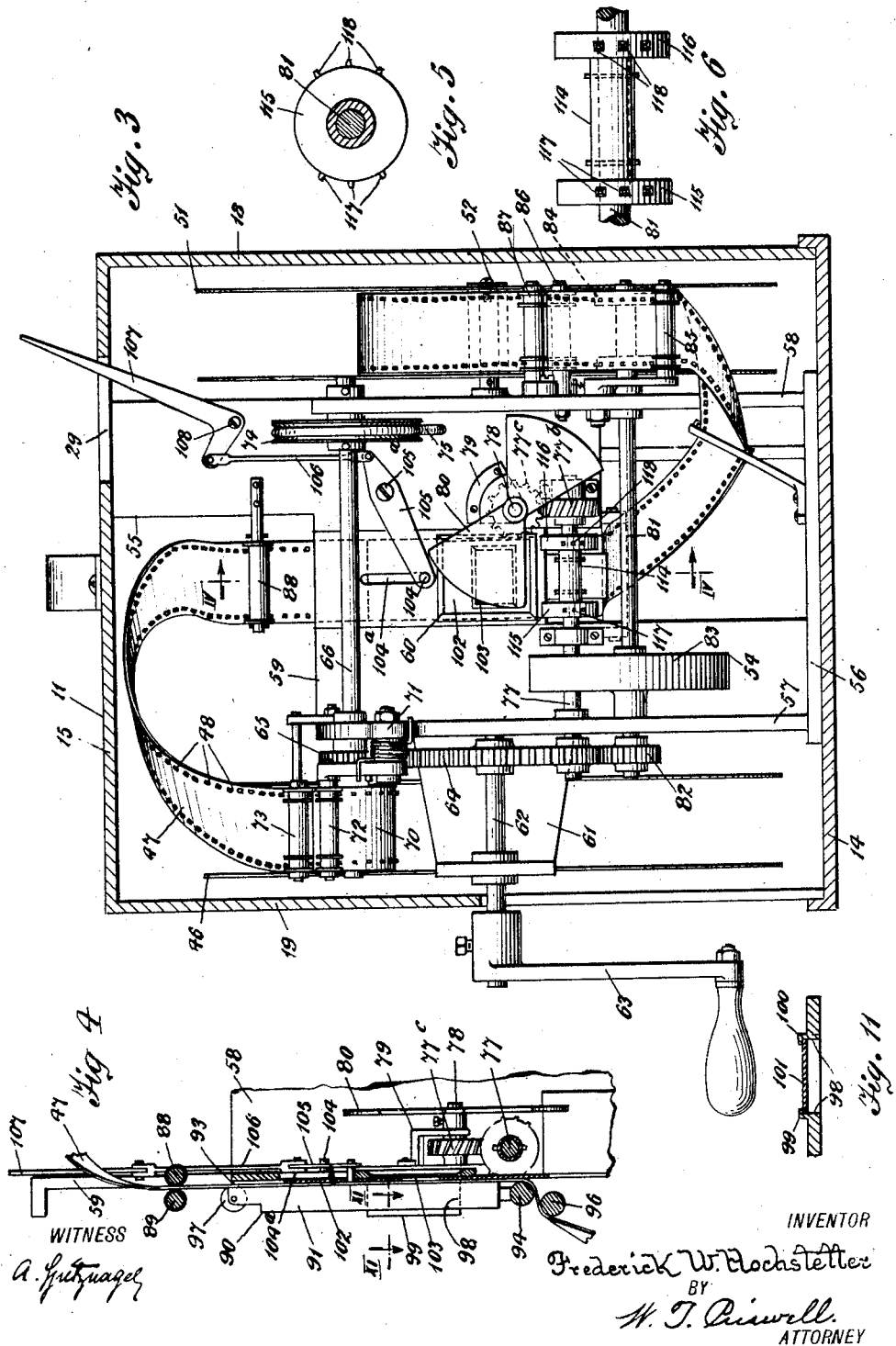
WITNESS
A. Gutzwagel
INVENTOR
Frederick W. Hochstetter
BY
W. T. Criswell.
ATTORNEY F. W. HOCHSTETTER.
CONVERTIBLE MOVING PICTURE MACHINE.
APPLICATION FILED MAR. 22, 1919.
1,372,619.
Patented Mar. 22, 1921.
4 SHEETS—SHEET 4.
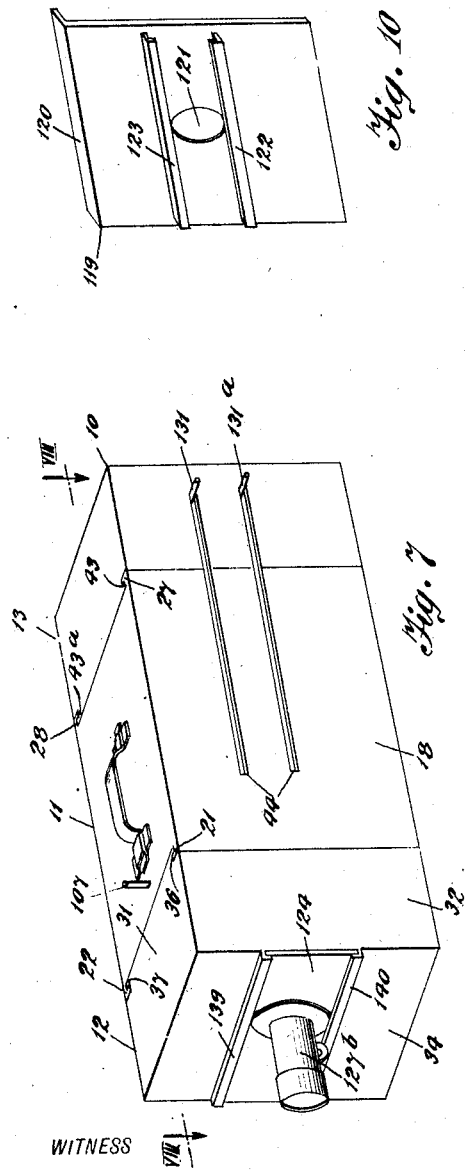
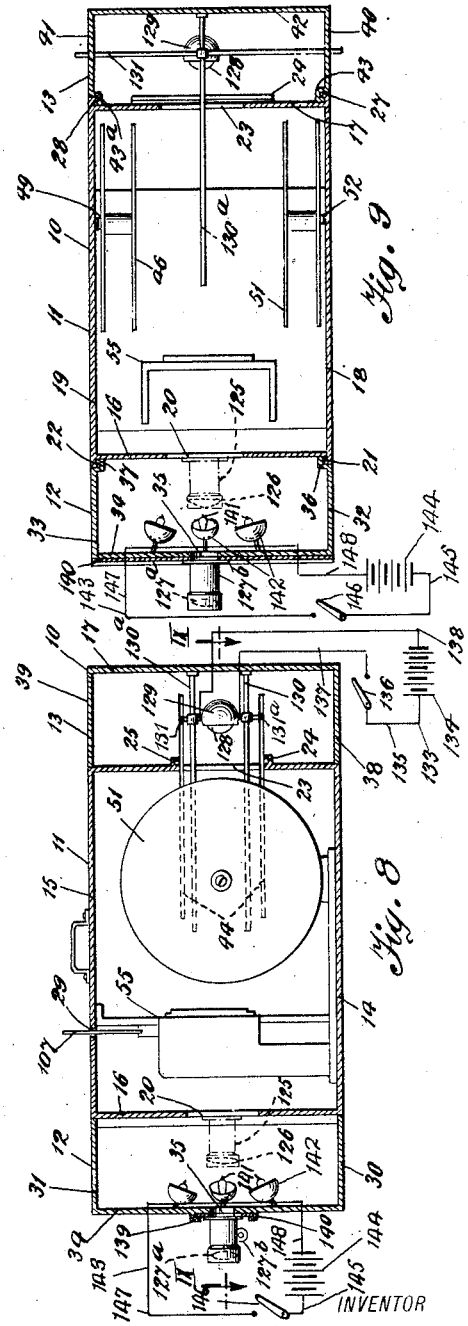
WITNESS
A. Fitznagel
INVENTOR
Frederick W. Hochstetter
BY
W. T. Criswell
ATTORNEY

UNITED STATES PATENT OFFICE.

FREDERICK W. HOCHSTETTER, OF NEW YORK, N. Y., ASSIGNOR OF ONE-HALF TO PAUL M. PIERSON, OF SCARBORO, NEW YORK.

CONVERTIBLE MOVING-PICTURE MACHINE.

1,372,619.      Specification of Letters Patent.     Patented Mar. 22, 1921.

Application filed March 22, 1919. Serial No. 284,387.

*To all whom it may concern:*

Be it known that I, FREDERICK W. HOCHSTETTER, a citizen of the United States, and a resident of New York, county and State of New York, have invented a certain new and useful Improvement in Convertible Moving-Picture Machines, of which the following is a full, clear, and exact specification.

This invention relates to a class of apparatus adapted to be used for producing and displaying moving pictures.

My invention has for its object primarily to provide a moving picture machine of an improved type to the form of machine disclosed in my patent numbered 1,133,378, issued March 30, 1915, and which is designed to be employed as a camera for photographing on a sensitized transparent strip or film successive pictures of animated objects or scenery, or for photographing on a sensitized opaque strip preferably of non-combustible material, consecutive pictures of objects, the machine being convertible for subsequent use as a projecting apparatus whereby the pictures on the transparent film or the pictures on the opaque strip may be displayed on a screen.

Another object of the invention is to construct a machine with certain detachable parts so that it may be employed independently as a camera, or as a projecting apparatus.

Still another object of the invention is to construct the machine whereby positives may be printed if desired from the negatives when developed following the photographing of the pictures on the sensitized strip, or film.

The invention consists essentially of a casing with a main section, a removable front section, and a detachable rear section, the opposed walls of the main section and the front section having registered exposure windows as well as being provided with means whereby lenses for photographing objects and for projecting the pictures may be interchangeably employed. In the main section of the casing may be a delivery reel and a receiving reel, and also in the main section is provided mechanism for transmitting the transparent film, or the opaque strip before the exposure windows. Operable by the transmitting mechanism is a continuously rotatable element, or sprocket formed so as to engage spaced parts of the strip, or film for causing the strip, or film to be intermittently transmitted before the exposure windows from the delivery reel so that each picture when projected will be exposed for a length of time whereby the use of a shutter for intermittently cutting off the light may be dispensed with, in order to display the pictures especially of an opaque strip on a screen. In the front section of the casing are one or a plurality of lamps with one or a plurality of reflectors to deflect the rays of light upon the pictures when an opaque strip is transmitted through the machine for projecting the pictures, and in the rear of the casing is a lamp with a reflector serving to deflect the rays of light upon the pictures when a transparent strip or film is transmitted through the machine for projection.

A further object of the invention is to provide a convertible moving picture machine of a simple, efficient and durable construction which is susceptible of being made for home use by amateurs or for general use by experts.

A practical embodiment of the invention is represented in the accompanying drawing forming a part of this specification in which similar characters of reference indicate corresponding parts in all the views, the said invention being more fully described hereinafter, and then pointed out in the claims at the end of the description.

In the drawings, Figure 1 is a longitudinal vertical section taken through the main section of the casing of one form of convertible moving picture machine embodying my invention, and which shows a view of one side of the operative mechanism of the machine.

Fig. 3 is a transverse vertical section taken through the main section of the casing showing a front view of the operating mechanism.

Fig. 4 is an enlarged fragmentary view, partly in section and partly in detail, taken on the line IV—IV of Fig. 3.

Fig. 5 is an enlarged detail sectional view taken through the continuously rotatable element or sprocket employed in the machine for causing a film or strip to be intermittently transmitted.

Fig. 6 is a fragmentary view showing an elevation of the rotatable element.

Fig. 7 is a perspective view of the machine when the parts thereof are assembled.

Fig. 8 is a detail sectional view taken on the line VIII—VIII of Fig. 7.

Fig. 9 is a detail sectional view taken on the line IX—IX of Fig. 8.

Fig. 10 is a perspective view of a slide adapted to be removably applied on the main section of the casing of the machine, and Fig. 11 is a section taken on the line XI—XI of Fig. 4.

Figure 1:
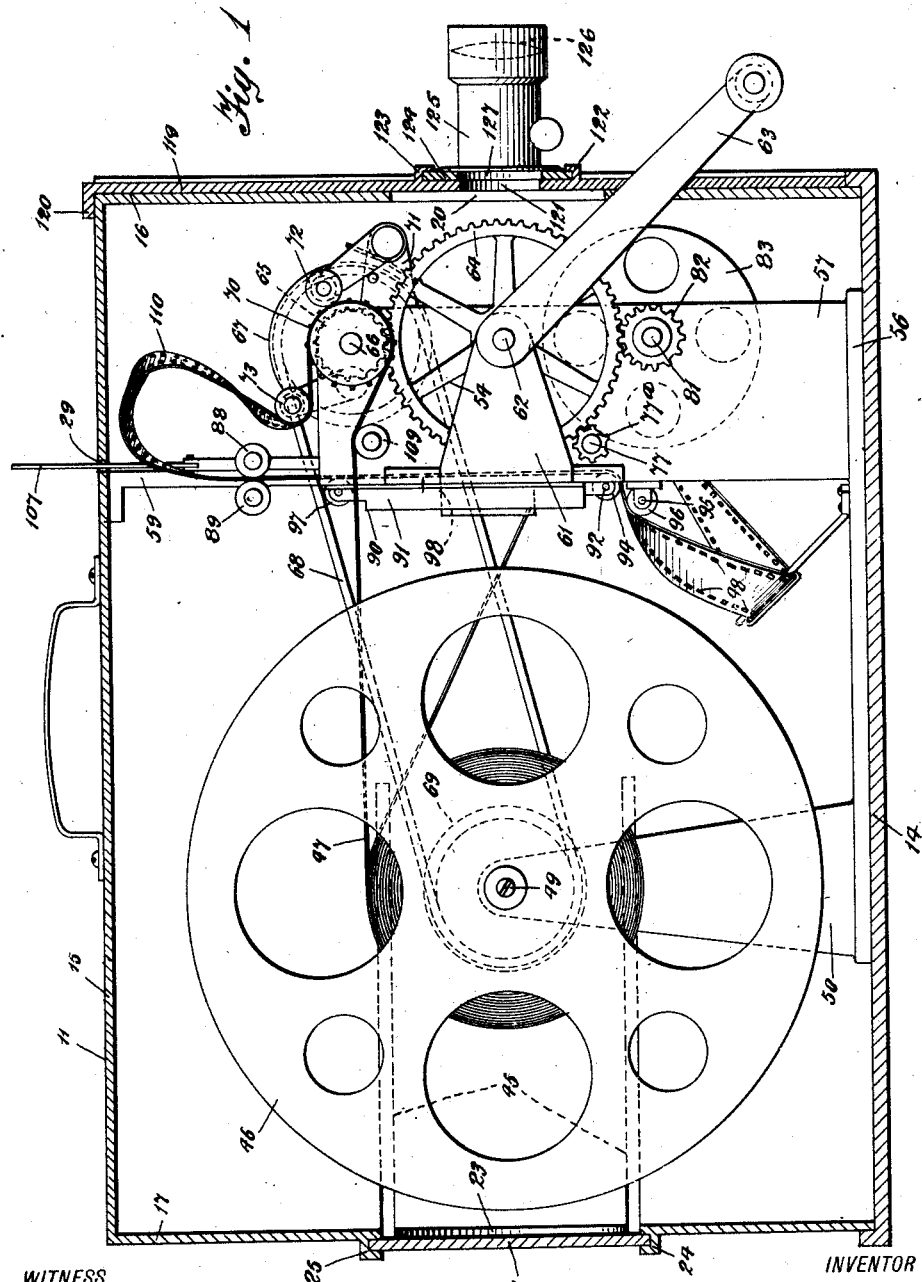
Figure 2:
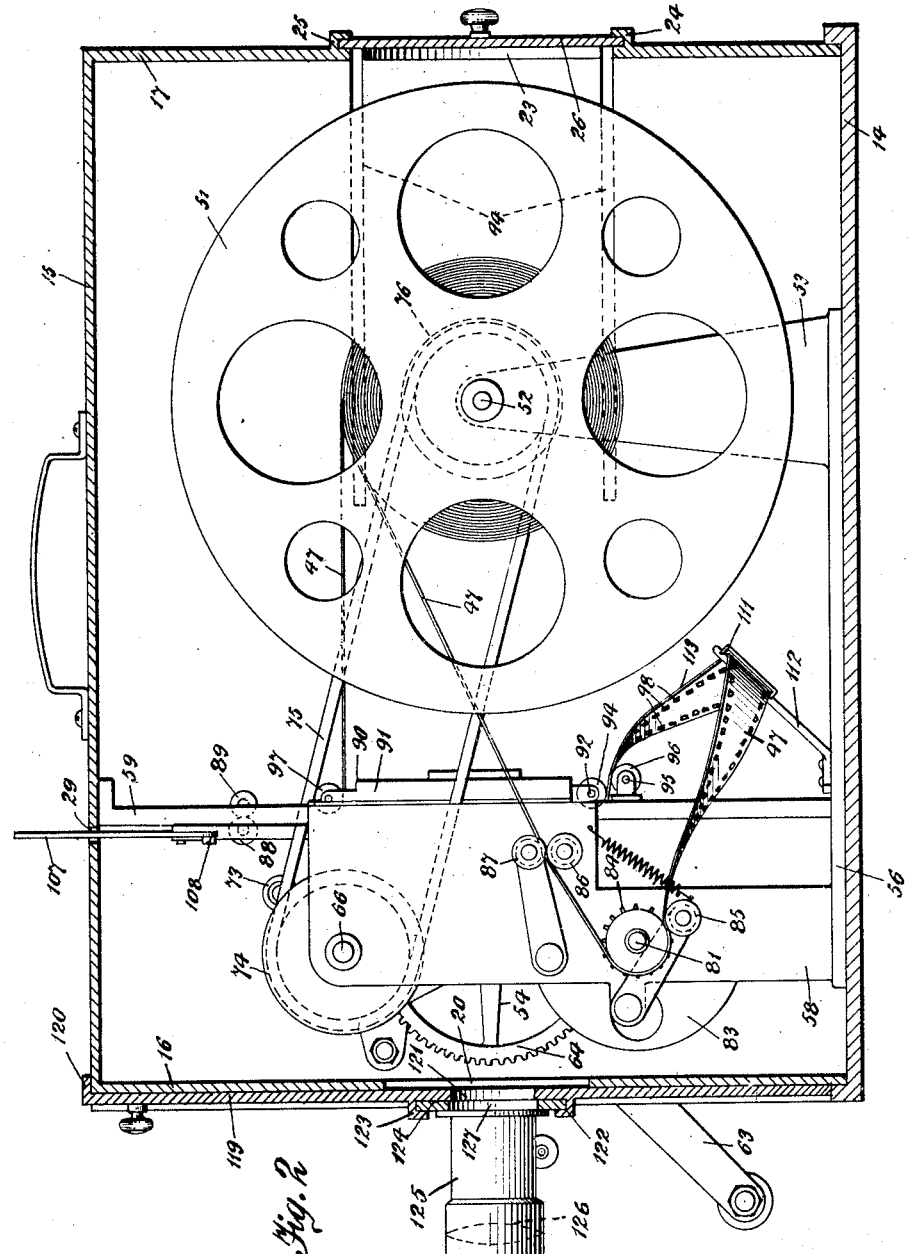
Fig. 2 is a longitudinal vertical section taken through the main section of the casing showing a view of the opposite side of the operative mechanism.

The convertible moving picture machine has a casing 10 composed of a main section 11, a removable front section 12, and a detachable rear section 13. The main section 11 of the casing may be of any suitable shape, though this section is preferably substantially rectangular, as viewed transversely, to provide a bottom 14, top 15, front wall 16, rear wall 17, side walls 18 and 19. In the front wall 16 of the main section 11 of the casing 10 is an exposure window 20, and projecting forwardly from this front wall, at its juncture with the side walls, are vertically disposed grooved flanges, as 21 and 22. Centrally of the rear wall 17 of the main section of the casing is an opening 23, and projecting from this rear wall adjacent to the upper and lower edges of the opening are two spaced grooved flanges 24 and 25 disposed transversely in parallel arrangement to allow a slide, as 26 Figs. 1 and 2, to be removably inserted in the grooves for closing the opening 23 when desired. Also extending from the rear wall 17 at its intersection with the side walls of the main section of the casing are two vertically disposed grooved flanges 27 and 28, and through the front part of the top 15 of this main section is an opening 29. The front section 12 of the casing has a bottom 30, top 31, side walls 32, 33, and a front wall 34, while the back of the front section is open, as shown, and this front section is of a height and width corresponding to the height and width of the main section 11 of the casing. Through the front wall 34 of the front section 12 of the casing is an exposure window 35 in register with the exposure window 20 of the front wall 16 of the main section, and extending from the rear edges of the side walls 32 and 33 of this front section are two vertically disposed grooved flanges 36 and 37 of forms so as to slidably interfit the grooved flanges 21 and 22 of the front wall 16 of the main section of the casing. The rear section 13 of the casing has a bottom 38, top 39, side walls 40, 41, and a back wall 42, while the front of this section is open. Projecting from the front edges of the side walls 40, 41 of the rear section 13 are two vertically disposed grooved flanges 43 and 43$^a$ of forms so as to be slidably interfitted in the grooved flanges 27 and 28 of the main section of the casing to allow the rear section to be readily applied to and removed from the main section. In parts of the side walls 18 and 19 of the main section of the casing as well as in adjacent parts of the side walls 40 and 41 of the rear section of the casing are pairs of spaced longitudinally disposed slots 44 and 45, and these pairs of slots are in register.

In the main section 11 of the casing 10 adjacent to the side wall 19 is a delivery reel 46 on which is wrapped a transparent strip or film, or an opaque strip, as 47, in the marginal lengthwise edges of which may be the usual spaced apertures 48 to allow the strip to be transmitted through the machine, as will be hereinafter more fully explained, the opaque strip being made of non-combustible material. The delivery reel 46 is rotatable on a short shaft, or stud 49 journaled in a bracket or standard 50, Fig. 1, extending upwardly from the bottom of this main section of the casing. Also in the main section of the casing adjacent to side wall 18 is a reel 51 for receiving the strip, or film after being transmitted through the machine, and this receiving reel is rotatable on the short shaft, or stud 52 journaled in a bracket or standard 53 projecting upwardly from the bottom of the main section of the casing.

Serving to transmit the transparent film or opaque strip through the machine before the exposure window 20 of the main section 11 of the casing from the delivery reel 46 to the receiving reel 51, a form of mechanism, as 54, is provided. The mechanism 54 has a frame 55 preferably constructed with a base-plate 56 arranged on the bottom of the main section of the casing, and projecting upwardly from spaced parts of the base-plate are two spaced side bars 57 and 58. The front edges of the side bars 57 and 58 may be spaced from the front wall 16 of the main section of the casing, and on the rear edges of the side bars is a transversely disposed back plate 59 with a window 60 therethrough in register with the exposure window 20 of the main section of the casing. Extending laterally from the side bar 57 of the frame 55 is an angular arm or bracket 61, and journaled in this bracket is a drive shaft 62 of a length so that one of its ends extends through an opening in one of the side walls of the main section of the casing. Held on the shaft 62 exteriorly of the main section of the casing is a crank handle 63 to allow the machine to be manually operated; though the drive shaft may be driven by any other suitable means if desired, and on the drive shaft adjacent to the side bar 57 of the frame is a gear 64. The gear 64 is in mesh with a pinion 65 held on a shaft 66 which is of a length so as to extend across the frame 55 for being journaled in the upper parts of both of the side bars 57 and 58 of the frame and so that one of the ends of this shaft will extend in proximity to the side wall 19 of the main section. On the shaft 66 adjacent to the pinion 65 is a pulley 67 over which is guided a belt 68, and this belt is also guided over a pulley 69 on the stud of the delivery reel 46 so that this reel will be rotated when the drive shaft is driven for revolving the gear 64 and the pinion 65. Also on the shaft 66 adjacent to the pulley 67 is a sprocket 70 of an ordinary type for engaging the apertures of the opaque strip, or film, and to yieldingly hold the strip, or film on the sprocket 70 in a lug 71 projecting from the side bar 57 of the frame 55 is movably mounted a spring actuated compression roller 72 of the usual form for movably holding the strip, or film on the forward part of the sprocket, and projecting from this side bar of the frame is another similar movable compression roller 73 which is spaced from the first compression roller for holding the strip, or film partly around the sprocket. On the shaft 66 adjacent to the side bar 58 of the frame 55 is a pulley 74 with a belt 75 disposed thereover, and this belt passes over a pulley 76 held on the stud 52 of the receiving reel 51 so that the receiving reel will be revolved for taking-up the opaque strip, or transparent film when delivered from the delivery reel by the operation of the mechanism. Journaled in the side bar 57 of the frame 55 as well as being journaled in bearings on the back plate 59 provided under the window 60 of the back plate, is a transversely disposed shaft 77 and on one end of this shaft is a pinion 77ª meshing with the gear 64 of the drive shaft 62. On the other end of the shaft 77 is a worm 77ᵇ in mesh with a worm gear 77ᶜ held on a shaft 78 which is journaled in the back plate 59 of the frame 55 as well as being journaled in a bracket, as 79, projecting from the back plate contiguous to the window 60. The shaft 78 extends some distance in front of the back plate of the frame, and on this shaft is a removable shutter 80 of a well known form with spaced opaque blades of sizes to intermittently cut off light projected through the window 60 for use when the machine is employed as a camera, as will be hereinafter more particularly explained. In the side bars 57 and 58 of the frame of the operative mechanism 54 is a third transversely disposed shaft 81 which is of a length so that its ends extend between the side bars of the frame and both of the side walls of the main section 11 of the casing of the machine, and on the shaft 81 is a pinion 82 also in mesh with the gear 64 of the drive shaft 62. On the shaft 81 adjacent to the side bar 57 of the frame 55 is a drive wheel 83, and on the second end of this shaft adjacent to the side bar 58 of the frame is a sprocket 84 which engages the opaque strip, or transparent film for guiding it to the receiving reel 51. Extending from the side bar 58 of the frame 55 is a rotatably movable spring actuated compression roller 85 for yieldingly holding the opaque strip, or transparent film, in contact with the sprocket 84, and also extending from this side bar of the frame are also two yieldingly contacting compression rollers 86 and 87 between which the strip, or film passes, while projecting from the back-plate 59 of the frame and above the window 60 are two other compression rollers 88 and 89 between which the strip, or film is guided.

In order to hold the strip, or film, in yielding contact with the back-plate 59 of the mechanism 55 when being transmitted through the machine as well as serving to register the pictures of the strip, or film with the window 60 of the back plate and with the exposure window 20 of the main section of the casing of the machine, a framing device, as 90, is provided. The framing device 90 has a plate 91 of preferably a substantially rectangular shape, and the lower end of this plate is pivoted, by means of a transverse rod, or shaft 92 to the back plate 59 at a distance below its window 60. In the back plate 59 of the frame 55 in opposed relation to the plate 91 is a vertically disposed groove 93 in which the opaque strip, or transparent film is movably disposed for being accurately guided between this back plate and the registered windows 60 and 20. On the shaft 92 under the plate 91 of the framing device is a roller 94, and on a shaft 95 journaled in spaced brackets projecting from the back plate 59 is a roller 96 contiguous to the roller 94, the strip, or film being also movably guided between these rollers. By pivoting the lower end of the plate 91 of the framing device 90 to the back plate of the frame 55 the upper part of the plate 91 may be swung to and from the back plate of the frame for allowing a strip, or film to be easily disposed in the groove 93 of the back plate of the frame 55, and on the upper end of the plate 91 of the framing device is still another roller 97 against which the strip or film moves. Also through the plate 91 of the framing device is an opening, or window 98 in register with the windows 60 and 20 of the back plate 59 of the frame 55 and of the main section of the casing, and projecting from the rear surface of this plate 91 are two spaced grooved flanges, or guides 99 and 100 between which is a removable plate 101 for opening and closing the passages through the registered windows 98, 60, 20. Manually adjustable upwardly and downwardly in the groove 93 of the back plate 59 of the frame 55 as well as being disposed before the strip, or film, is a slide 102 having an aperture, or window 103 which is approximately the same size as each of the pictures on the strip, or film, but this window may be considerably smaller than the window 60 of the back plate of the frame, while the slide is preferably considerably larger than the window 60. Extending from an upper part of the slide 102 is a pin 104 movably disposed through a slot 104$^a$, provided in the upper part of the back plate 59 of the frame 55. Rotatable on the free end of the pin 104 is one end of a lever 105 which is fulcrumed, at 105$^a$, to the back plate of the frame, and pivoted to the second end of the lever 105 is the lower end of a rod or bar 106 having its other end pivoted to the lower end of a handle, as 107, which is of a length so that its upper end extends through the opening 29 in the top of the main section 11 of the casing of the machine. The handle 107 may be substantially L-shaped, and this handle is pivoted, at 108, to the back plate 59 of the frame 55 so that when manually swung back and forth transversely of the main section of the casing, the rod 106 and lever 105 will be moved upwardly and downwardly for also guiding the slide 102 upwardly and downwardly in the groove 93 of the back plate 59 of the frame of the operative mechanism 54 to register the pictures of the strip, or film with the aperture 103 of the slide.

When an opaque strip, or film is arranged in the machine it is guided from the delivery reel 46 over a roller 109 projecting from the side bar 57 of the frame 55, and from this roller the strip, or film is passed over the sprocket 70 under the compression rollers 72 and 73. A loop, as 110, is formed in the strip, or film, after which it is guided between the compression rollers 88 and 89, then into the grooves 93 of the back plate 59 of the frame as well as being disposed between the slide 102 and the plate 91 of the framing device 90 for transmission before the window 103 of the slide, before the window 60 of the back plate of the frame, and before the exposure window 20 of the casing. From the windows 60 and 103 the strip, or film is passed back of the shaft 81, then through the aperture 111 of a guide bar 112 projecting upwardly from the base-plate 56 back of the frame 55, this arrangement of the strip, or film forming a lower loop 113 therein. The strip, or film is then passed over the compression roller 85, over the top of the sprocket 84, and between the compression rollers 86 and 87 for being taken up by the receiving reel 51. By turning the crank handle 63, the drive gear 64, pinions 65, 77$^a$, 82 will be revolved for rotating the shafts 66, 77, 81, and the sprocket 70 and 84 together with the pulleys 67 and 74 will likewise be rotated for transmitting the strip, or film before the windows 60, 103, and 20.

Serving to cause the strip, or film to be intermittently transmitted before the windows 60, 103 and 20 held on the part of the shaft 77 under these windows is an element, or sprocket 114 which is continuously rotated by the rotation of this shaft during the operation of the mechanism 54 of the machine. The intermittent transmitting element or sprocket 114 is preferably formed with two spaced circular disks 115 and 116 of similar diameters, and projecting from corresponding diametrically opposite parts of the periphery of each of the disks are sets of spaced teeth, as 117 and 118. Each set of the teeth may consist of one, or a suitable number, though in each set I prefer to employ three of the teeth, and the teeth of each set are spaced sufficient distances to engage the apertures of the strip, or film as is incident to the usual forms of sprockets used for transmitting motion picture films. But the spaces between the sets of teeth of each disk are twice the extreme space occupied by each set of the teeth, for instance both sets of the teeth of each disk embrace approximately two-sixths of the circumference of the disk while the spaces therebetween are equivalent to approximately four-sixths of the circumference of the disk. Moreover, the pinions 77$^a$, 65, 82 and the disks 115 and 116 of the element, or sprocket 114 are of relative diameters so that when the shafts 77, 66, 81, are driven the sets of teeth of this element, or sprocket will engage the apertures of the strip, or film at intervals to cause it to travel intermittently before the exposure windows 60, 103, 20. The pictures of the strip, or film will then be exposed for a period of time so that the use of a shutter for intermittently cutting-off the light may be dispensed with especially when displaying the pictures of an opaque strip on a screen, the sets of teeth of the element, or sprocket 114 being arranged for engaging the strip, or film whereby it will be transmitted for successively exposing the pictures, and during the exposures of the pictures the slide 102 of the framing device 90 may be adjusted to register its window 103 with each picture by manipulating the handle 107 accordingly, as above explained.

When the machine is employed as a camera for photographing pictures of animated objects, or scenery the main section 11 of the casing 10 with the operating mechanism may be used alone. The opening 23 in the rear wall of this main section of the casing is then closed by inserting the plate 26 in the grooves of the flanges 24 and 25 of the rear wall, and in the grooves of the flanges 21 and 22 of the front wall 16 of the main section of the casing may be removably disposed a plate, as 119, Figs. 1, 2, 10. The plate 119 has on its upper edge a rightangularly disposed flange 120 adapted to rest upon the top of the main section of the casing to prevent the plate from downward movement when applied to this section of the casing, and centrally through the plate is an opening 121 which registers with the exposure window 20 of the main section. Extending from the exposed surface of the plate 119 contiguous to the opening 121 are two spaced parallel grooved flanges 122 and 123, one above and one below the opening, and in the grooves of these flanges are removably inserted a slide 124 with a barrel 125 provided thereon. In the barrel 125 is mounted a lens 126 suitable for photographing pictures, and through the slide is an opening 127 in register with the lens and with the opening 121 as well as with the exposure window 20 of the main section of the casing. A sensitized opaque strip, or a sensitized transparent film is then transmitted from the delivery reel 46 to the receiving reel 51 through the machine and intermittently before the lens, as hereinbefore explained. When the machine is used as a camera the removable shutter 80 is applied on the rod 78 for being driven to intermittently cut off the rays of light from the lens in the usual manner, this rod being rotated by the operation of the worm gear 77$^c$, and worm 77$^b$ which are revolved by the shaft 77 when driven by the mechanism. The negative opaque strip, or transparent film when thus produced is developed in the usual manner into a positive.

In order to project the pictures of a positive transparent film on a screen the plate 26 is removed from the grooved flanges 24 and 25 of the rear plate 17 of the main section 11 of the casing 10 for opening the passage through the opening 23, and the rear section 13 of the casing 10 is detachably applied to the main section 11 by interfitting the grooved flanges 43 and 43$^a$ of the rear section in the grooved flanges 27 and 28 of the main section of the casing. The shutter 80 may be removed, or may remain on the rod 78 as occasion requires, and instead of a photographic lens, a projecting lens, as 127$^a$, with a barrel, as 127$^b$, is used on the main section of the casing at the exposure window 20. While I may use in any desired manner a suitable lamp for projecting the pictures of the transparent film on a screen, in this form of machine I prefer to arrange an electric lamp, as 128, in the rear section 13 of the casing 10 so that its light will be projected through the opening 23, through the exposure window 20, on the pictures of the film. The lamp 128 is mounted in a reflector, as 129, arranged so as to be movable between two spaced stationary rods 130 and 130$^a$ extending from the back wall 42 of the rear section 13 of the casing one at each side of the reflector so as to be guided through the opening 23 into the main section of the casing, and this reflector is connected to two transverse rods 131 and 131$^a$ both of which are of lengths so that their ends slidably extend through the pairs of slots 44 and 45 of the main section of the casing. The transverse rods 131 and 131$^a$ are connected by means of sleeves which are slidable on the stationary rods 130 and 130$^a$ so that the reflector and the lamp may be adjustably moved forwardly and backwardly relative to the exposure window 20 of the main section of the casing in order to suitably regulate the rays of light deflected on the transparent film when the pictures thereof are being projected in the usual manner. The lamp 128 may be lighted through an electric circuit, as 133, leading from any suitable source of supply, for instance from a battery, as 134, from one terminal of which leads a wire 135 to one contact of a switch, as 136, and to the second contact of the switch is connected a wire 137 leading to one pole of the lamp, while from the second terminal of the battery is another wire 138 leading to the second pole of the lamp. When the switch is closed on its contacts the current will pass from the battery over the wire 135, through the switch 136, over the wire 137 to the lamp, and also from the second pole of the lamp the current will pass over the wire 138 to the battery. The lamp will then be lighted for a suitable period of time, and by disconnecting the engagement of the switch with its contact the current will be shut off for extinguishing the lamp.

To project the pictures of a positive opaque strip on a screen, the rear section 13 of the casing with the lamp 128, reflector 129, and rods 130, 130$^a$, 131, 131$^a$ are removed from the main section 11 of the casing. The aperture 23 of the rear wall of this main section is also closed by inserting the plate 26 in the grooves of the flanges 24 and 25 of the rear wall of the main section. The opening 98 of the plate 91 of the framing device 90 is also closed by inserting the plate 101, Fig. 11, in the grooved flanges 99 and 100 of the plate 91, and the projecting lens 127$^a$ and barrel 127$^b$ with its slide are applied on the front wall 34 of the front section 12 of the casing at its window 35 by disposing the slide between two spaced grooved flanges 139 and 140 extending from the front wall of the front section of the casing as shown in Figs. 7, 8, 9, one flange being below and one above the window 35 so that the projecting lens will be in the path of the rays of light projected through the window. The positive opaque strip is arranged in the machine for transmission by the operating mechanism 54 in a manner similar to transmitting a transparent film, as above explained, and to cause the pictures of the opaque strip to be projected, in front of the exposure window 20 of the main section of the casing, and preferably on the inner surface of the front wall of the front section 12 are provided one or a suitable number of lamps 141 each of which are preferably electrically lighted. In my patent for convertible moving picture machine, No. 1,133,378, a plurality of lamps mounted in a single reflector, are shown, and in this present machine each of the lamps 141 is preferably mounted in a single reflector, as 142, though I may use a single reflector in conjunction with the present machine instead of a plurality of reflectors as occasion may require. The reflectors 142 with the lamps 141 are arranged so that the light from the lamps will be deflected on the pictures of the opaque strip when intermittently exposed in succession through the exposure window 20 and the pictures will thereby be projected through the window 35 of the front section of the casing as well as through the lens barrel 127ᵇ and lens 127ᵃ for being displayed on a screen. The lamps 141 may be lighted in series, or singly from a normally open electric circuit, as 143, leading from any suitable source of electricity supply, as from a battery 144, from one terminal of which is a wire 145 leading to one contact of a switch 146, and from the second contact of the switch is a wire 147 leading to one pole of the lamps. From the second terminal of the battery 144 is a wire 148 leading to the second pole of the lamps so that when the switch 145 is moved into engagement with its contacts the circuit will be closed from the battery over the wires 145, through the switch 146, over the wire 147 to the lamps, and from the lamps over the wire 148 to and through the battery. By swinging the switch 146 free of its contacts the circuit will be opened for extinguishing the lamps when desired. Thus a simple and efficient moving picture machine is provided for photographing on a sensitized transparent strip, or on a sensitized opaque strip of paper, or other material pictures of animated objects, scenery and the like as well as being adapted to be converted for subsequent use as a projecting apparatus whereby the pictures of the film, or strip may be displayed on a screen. Moreover, when it is desired to employ the machine for printing positives from the developed negatives the front section 12 of the casing with the electric lamps 141 are used in a manner similar to the use of the customary printing machine of this class, the positive strips or films being transmitted before these lamps together and in unison by means of the mechanism 54.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. The combination, in a moving picture machine, of a casing having an exposure window, a removable chamber on the front of the casing with a lens arranged in spaced relation before the window so that its optical axis is coincident with the center of the window, mechanism in the casing for intermittently transmitting a strip with pictures thereon whereby each picture will be successively exposed through the exposure window, a lamp in the removable chamber in front of the exposure window, a reflector in the chamber for deflecting the rays of light of the lamp on the pictures when exposed through the window whereby the pictures may be projected by the lens, a removable chamber on the rear of the casing, a lamp in the rear chamber, and a reflector in the rear chamber for deflecting the rays of light of the lamp on the strip, substantially as set forth and for the purpose specified.

2. The combination, in a moving picture machine, of a casing having an exposure window, a removable chamber on the front of the casing with a lens arranged in spaced relation before the window so that its optical axis is coincident with the center of the window, mechanism in the casing for intermittently transmitting a strip with pictures thereon whereby each picture will be successively exposed through the exposure window, a plurality of lamps in the removable chamber in front of the exposure window, a plurality of reflectors in the chamber in each of which is mounted one of the lamps for deflecting the rays of light of the lamps on the pictures when exposed through the window whereby the pictures may be projected by the lens, a removable chamber on the rear of the casing, a lamp in the rear chamber, and a reflector in the rear chamber for deflecting the rays of light of the lamp on the strip, substantially as set forth and for the purpose specified.

3. The combination, in a moving picture machine, of a casing having an exposure window, a removable chamber on the casing with a lens arranged in spaced relation before the window so that its optical axis is coincident with the center of the window, mechanism in the casing for transmitting a strip with pictures thereon whereby each picture will be successively exposed through the exposure window, a continuously rotatable sprocket element driven by the mechanism, and formed to engage the strip at intervals to cause the strip to be intermittently checked during its transmission, a lamp in the removable chamber in front of the exposure window, a reflector in the chamber for deflecting the rays of light of the lamp on the pictures of an opaque strip when exposed through the window whereby the pictures may be projected by the lens, a removable chamber on the rear of the casing, a lamp in the rear chamber, and a reflector in the rear chamber for deflecting the rays of light of the lamp through a transparent picture strip, substantially as set forth and for the purpose specified.

4. The combination, in a moving picture machine, of a casing having an exposure window, a removable chamber on the casing with a lens arranged in spaced relation before the window so that its optical axis is coincident with the center of the window, mechanism in the casing for transmitting a strip with pictures thereon whereby each picture will be successively exposed through the exposure window, a continuously rotatable sprocket element driven by the mechanism, and formed to engage the strip at intervals to cause the strip to be intermittently checked during its transmission, a plurality of lamps in the removable chamber in front of the exposure window, and a plurality of reflectors in the chamber in each of which is mounted one of the lamps for deflecting the rays of light of the lamp on the pictures of an opaque strip when exposed through the window whereby the pictures may be projected by the lens, a removable chamber on the rear of the casing, a lamp in the rear chamber, and a reflector in the rear chamber for deflecting the rays of light of the lamp through a transparent picture strip, substantially as set forth and for the purpose specified.

5. A moving picture machine including a casing provided with an exposure window, means in said casing for intermittently exposing successive portions of a film strip through said exposure window, lighting means rearwardly of said exposure window for projecting light through said film strip when the latter is transparent, a detachable front section for said casing having means for projection of pictures by reflection when said film strip is substantially opaque, and a detachable rear section for said casing carrying said lighting means.

6. A moving picture machine including a casing provided with an exposure window, means in said casing for intermittently exposing successive portions of a film strip through said exposure window, lighting means rearwardly of said exposure window for projecting light through said film strip when the latter is transparent, a detachable front section for said casing having means for projection of pictures by reflection when said film strip is substantially opaque, a detachable rear section for said casing carrying said lighting means, said casing having a rear opening for permitting passage of light from said lighting means to the film, and a removable closure for closing said rear opening when the rear section is detached.

7. A moving picture machine including a casing provided with an exposure window, means in said casing for intermittently exposing successive portions of a film strip through said exposure window, lighting means rearwardly of said exposure window for projecting light through said film strip when the latter is transparent, a detachable front section for said casing having means for projection of pictures by reflection when said film strip is substantially opaque, a detachable rear section for said casing carrying said lighting means, said lighting means including a lamp, and means associated with the casing and the rear section to permit adjustment of said lamp toward or away from the exposing window at a desired point in either the casing or the rear section.

This specification signed and witnessed this 21 day of March A. D. 1919.

FREDERICK W. HOCHSTETTER.

Witnesses:
J. FREDERICK CRYER.
D. KOEPER.